United States Patent
Unuma et al.

(10) Patent No.: US 10,620,082 B2
(45) Date of Patent: Apr. 14, 2020

(54) METHOD AND DEVICE DISPLAYING MATERIAL FATIGUE OF MACHINE

(71) Applicant: Hitachi, Ltd., Chiyoda-ku, Tokyo (JP)

(72) Inventors: Munetoshi Unuma, Tokyo (JP); Shinya Yuda, Tokyo (JP); Takashi Saeki, Tokyo (JP); Hideaki Suzuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 60 days.

(21) Appl. No.: 15/108,078

(22) PCT Filed: Mar. 3, 2014

(86) PCT No.: PCT/JP2014/055210
§ 371 (c)(1),
(2) Date: Jun. 24, 2016

(87) PCT Pub. No.: WO2015/132838
PCT Pub. Date: Sep. 11, 2015

(65) Prior Publication Data
US 2016/0320262 A1 Nov. 3, 2016

(51) Int. Cl.
*G01M 5/00* (2006.01)
*G01M 13/00* (2019.01)
*G01M 17/007* (2006.01)

(52) U.S. Cl.
CPC .......... *G01M 5/0033* (2013.01); *G01M 13/00* (2013.01); *G01M 17/007* (2013.01)

(58) Field of Classification Search
CPC . G01M 5/0033; G01M 5/0041; G01M 17/007
See application file for complete search history.

(56) References Cited

U.S. PATENT DOCUMENTS 4,258,421 A * 3/1981 Juhasz ................... G07C 5/085
340/870.16
4,495,585 A * 1/1985 Buckley ................. G01R 23/16
345/40

(Continued)

FOREIGN PATENT DOCUMENTS

JP 9-243518 A 9/1997
JP 10-96723 A 4/1998

(Continued)

OTHER PUBLICATIONS

Cai Xianxin et al., "An EHM system and its life prediction method", 2013, 5th International Conference on Computational Intelligence and Communication Networks (Year: 2013).*

(Continued)

*Primary Examiner* — Lisa M Caputo
*Assistant Examiner* — Tran M. Tran
(74) *Attorney, Agent, or Firm* — Crowell & Moring LLP

(57) ABSTRACT

To associate condition information, such as (a) a location in a movement section at which fatigue occurred, (b) a type of work or operation during which fatigue occurred, and (c) a type of natural phenomenon experienced when fatigue occurred, a device for displaying the material fatigue of a machine is configured to observe stress variation in a time series using a sensor correlated with the stress variation or stress of a machine. Stress variation in a single cycle and the time when the stress variation occurred are detected, and the stress variation value and time of occurrence are output and displayed.

20 Claims, 16 Drawing Sheets

(56) References Cited

U.S. PATENT DOCUMENTS

| | | | | |
|---|---|---|---|---|
| 5,600,576 | A * | 2/1997 | Broadwater | G01D 9/005 702/187 |
| 5,754,122 | A * | 5/1998 | Li | G08C 13/02 340/870.03 |
| 5,847,668 | A * | 12/1998 | Morita | G07C 3/00 341/132 |
| 6,449,565 | B1 * | 9/2002 | Budrow | G07C 3/00 378/72 |
| 6,532,825 | B1 * | 3/2003 | Abe | G01M 5/0033 73/799 |
| 7,181,959 | B2 * | 2/2007 | Matsumoto | F02B 39/16 73/114.01 |
| 7,185,545 | B2 * | 3/2007 | Wright, III | G01N 3/066 324/716 |
| 7,454,297 | B2 * | 11/2008 | Balestra | G07C 5/0841 702/34 |
| 7,480,573 | B2 * | 1/2009 | Toyosada | G01N 3/32 702/34 |
| 7,945,606 | B2 * | 5/2011 | Balestra | G01D 1/12 702/193 |
| 7,953,559 | B2 * | 5/2011 | Sundermeyer | G01N 3/32 702/183 |
| 8,260,488 | B2 * | 9/2012 | Ishikawa | G07C 5/085 701/29.1 |
| 8,478,457 | B2 * | 7/2013 | Bendisch | G07C 3/00 701/120 |
| 8,521,443 | B2 * | 8/2013 | Vichare | G06F 11/008 702/179 |
| 8,638,217 | B2 * | 1/2014 | Arms | B64C 27/006 307/151 |
| 8,707,795 | B2 * | 4/2014 | Kittur | G01N 3/32 73/774 |
| 9,015,516 | B2 * | 4/2015 | Hadley | G06F 21/54 710/240 |
| 9,069,917 | B2 * | 6/2015 | Shimanuki | G06F 17/5018 |
| 9,103,741 | B2 * | 8/2015 | Baik | G01M 5/0016 |
| 9,222,865 | B2 * | 12/2015 | Khonsari | G01N 3/34 |
| 9,315,970 | B2 * | 4/2016 | Chitty | E02F 9/267 |
| 9,451,709 | B2 * | 9/2016 | Monda | H05K 3/3436 |
| 9,678,845 | B2 * | 6/2017 | Suzuki | G06F 11/30 |
| 2007/0295098 | A1 | 12/2007 | Balestra | |
| 2008/0247448 | A1 | 10/2008 | Balestra | |
| 2008/0294354 | A1 * | 11/2008 | Zhu | G01H 1/00 702/39 |
| 2010/0332153 | A1 * | 12/2010 | Vegter | F16C 33/64 702/42 |
| 2015/0039248 | A1 * | 2/2015 | Meis | G01M 7/025 702/42 |

FOREIGN PATENT DOCUMENTS

| | | |
|---|---|---|
| JP | 2006-51572 A | 2/2006 |
| JP | 2010-139248 A | 6/2010 |
| JP | 2013-79920 A | 5/2013 |
| WO | WO 2013/122066 A1 | 8/2013 |
| WO | WO 2013/172277 A1 | 1/2016 |

OTHER PUBLICATIONS

Yung-Li Lee et al., "Rainflow cycle counting techniques", 2012, Metal Fatigue Analysis Handbook (Year: 2012).*

Yung-Li Lee et al., "Cycle Counting Techniques", 2005, Fatigue testing and analysis, pp. 77-102 (Year: 2005).*

International Search Report (PCT/ISA/210) issued in PCT Application No. PCT/JP2014/055210 dated Apr. 1, 2014 with English translation (Four (4) pages).

Endo, T., et al., "Refined Rainflow Algorithm : P/V Difference Method", Japan Society of Materials Science Journal "Material", 1981, vol. 30, No. 323, pp. 89-93 with English summary (Five (5) pages).

* cited by examiner

[Fig. 1]
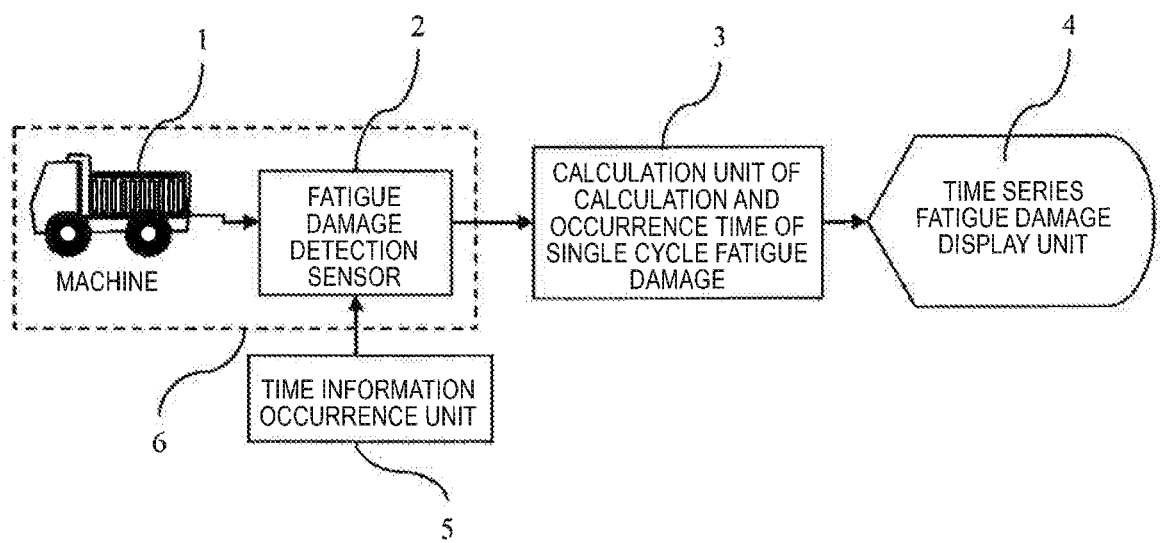

[Fig. 2]
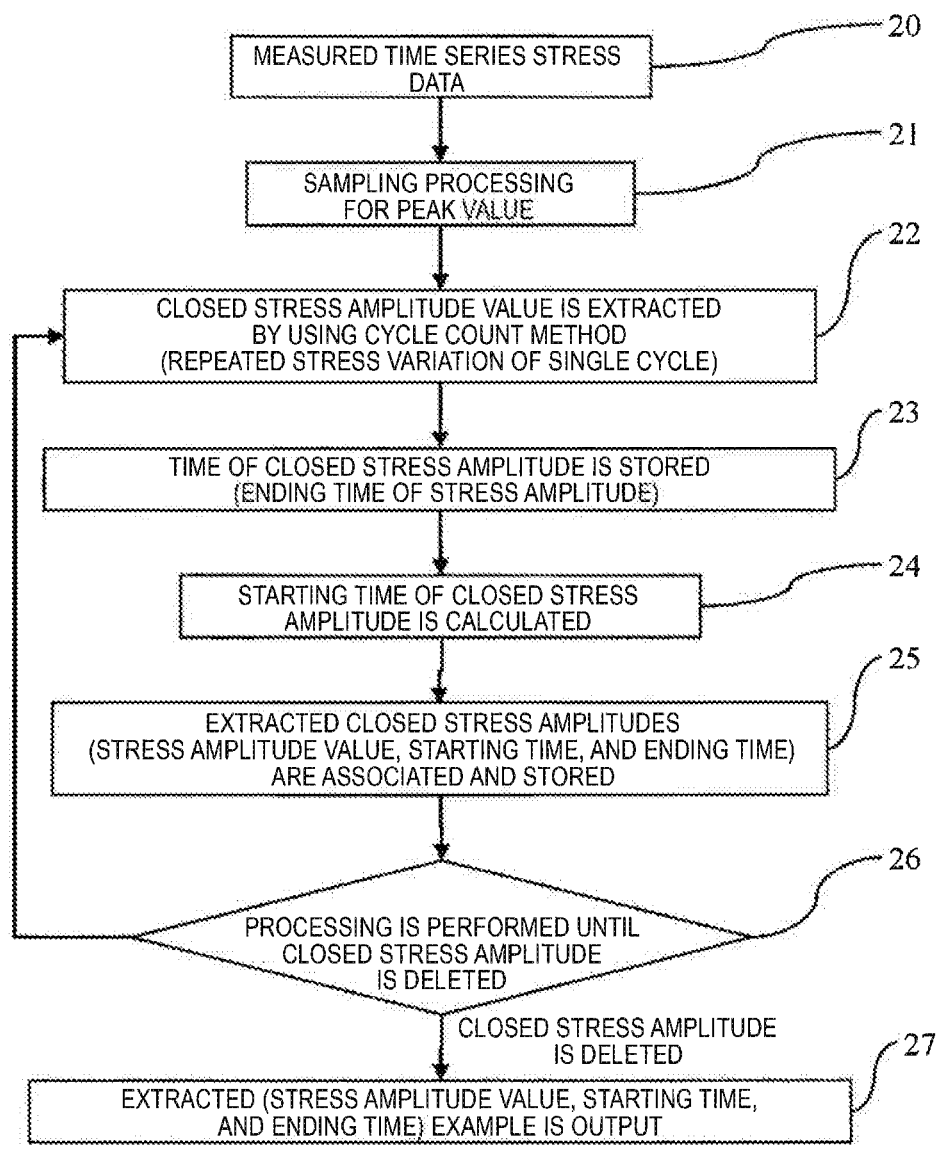

[Fig. 3]
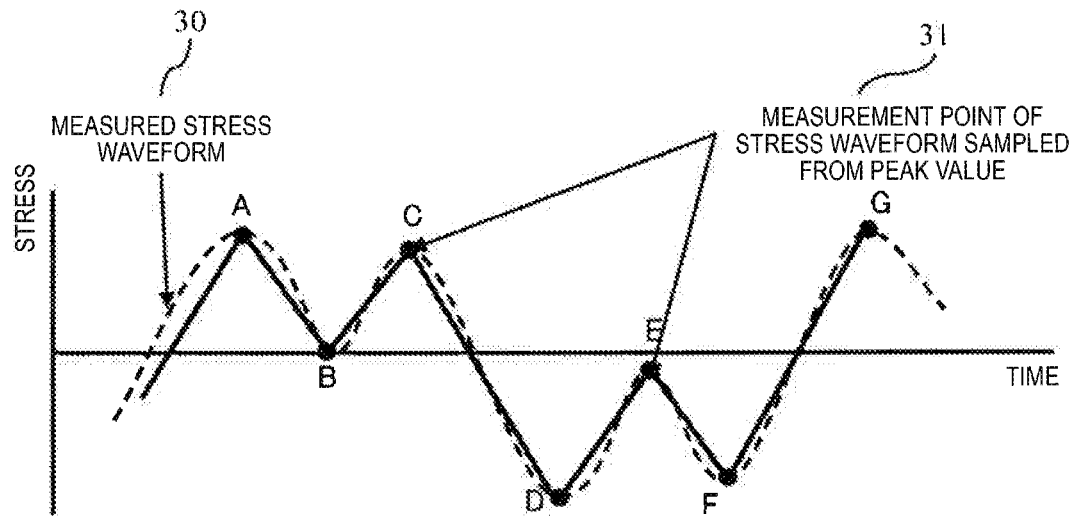
[Fig. 4]
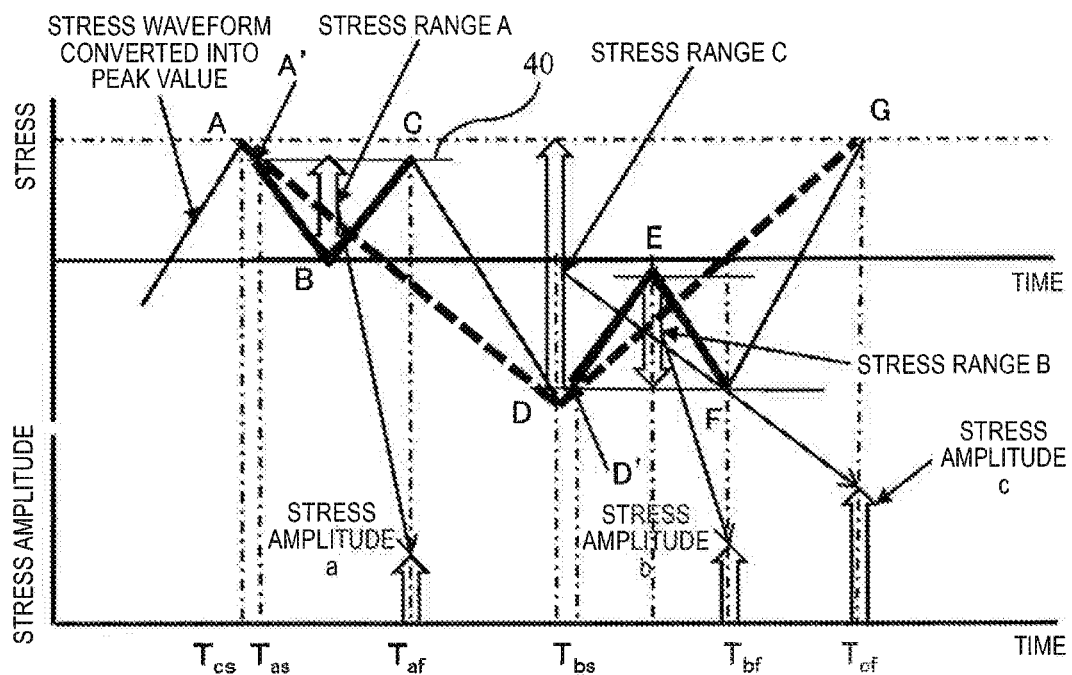

[Fig. 5]
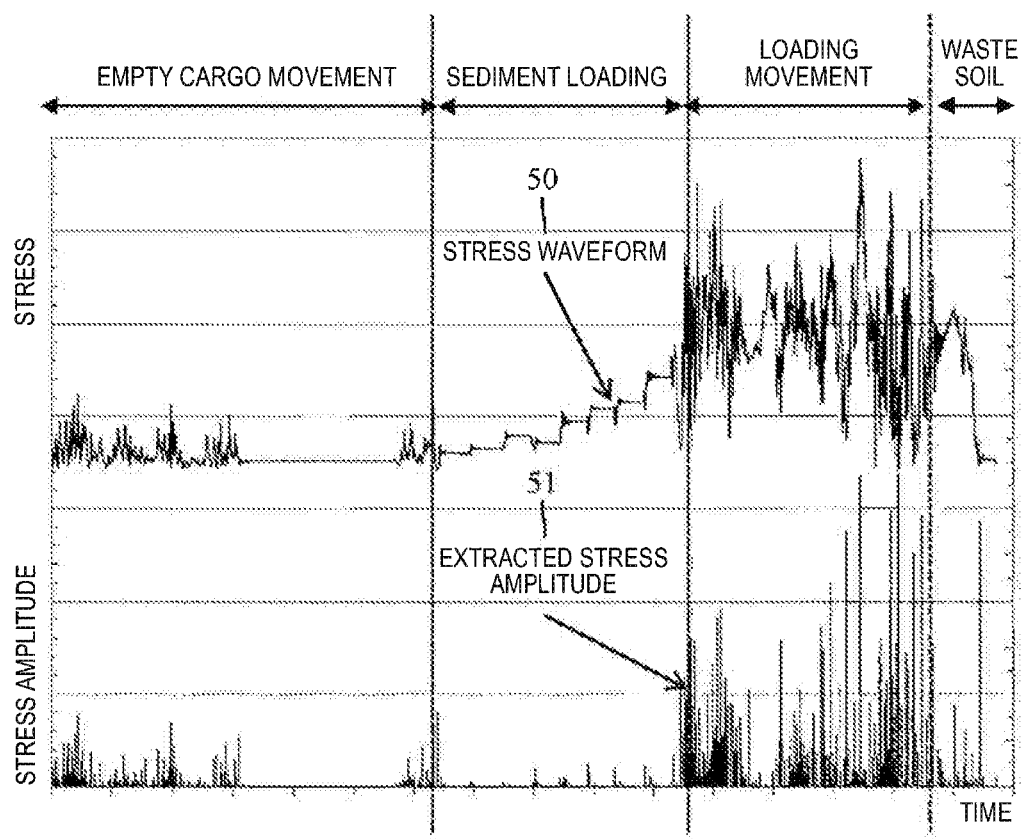

[Fig. 6]
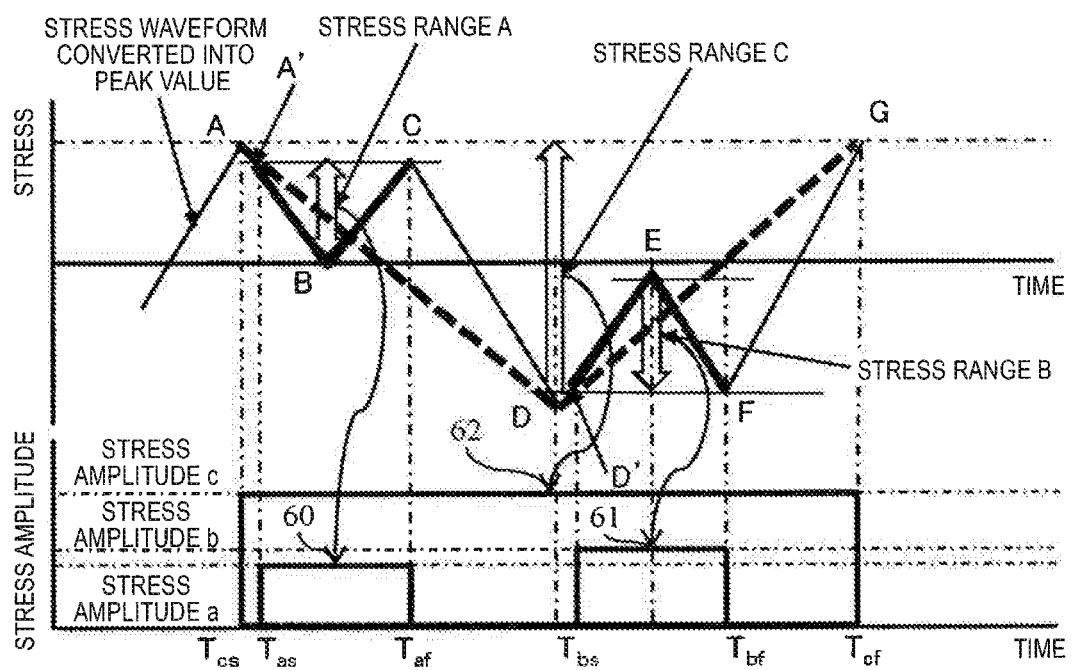

[Fig. 7]
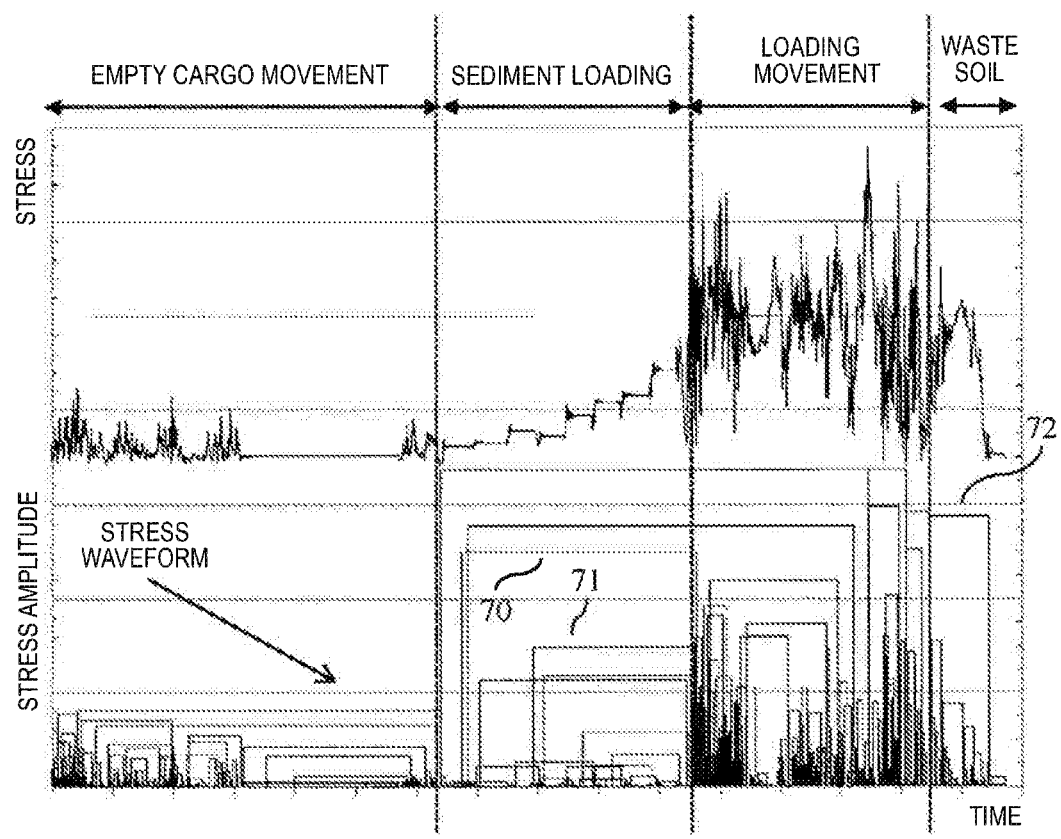

[Fig. 8]
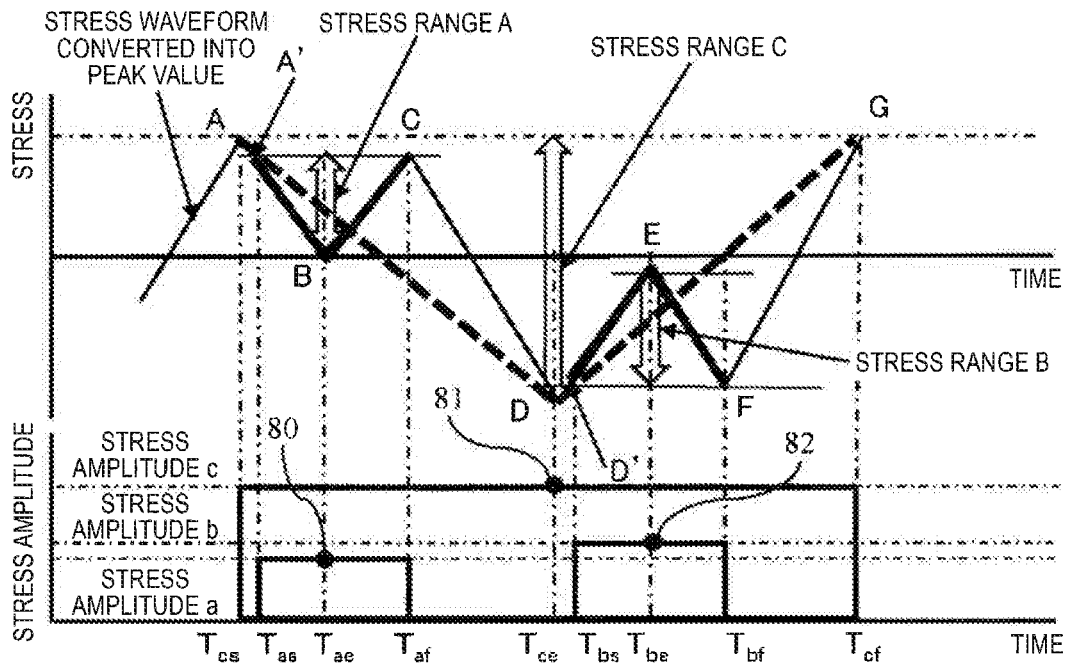
[Fig. 9]
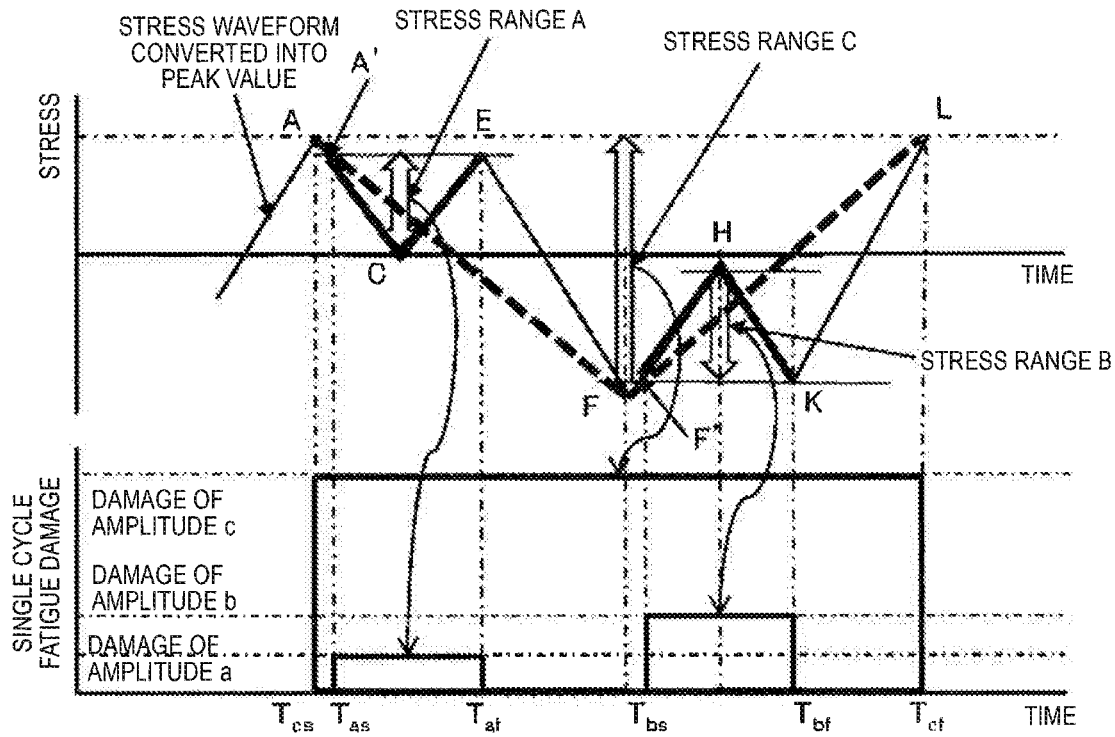

[Fig. 10]
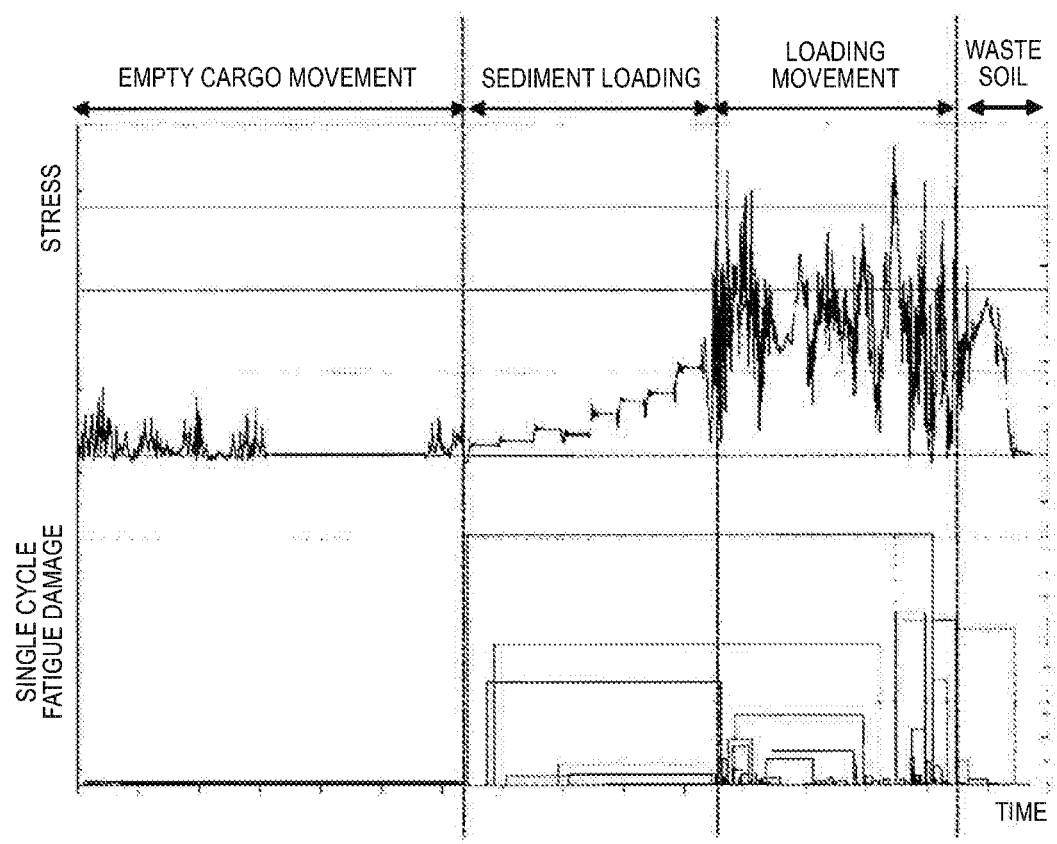

[Fig. 11]
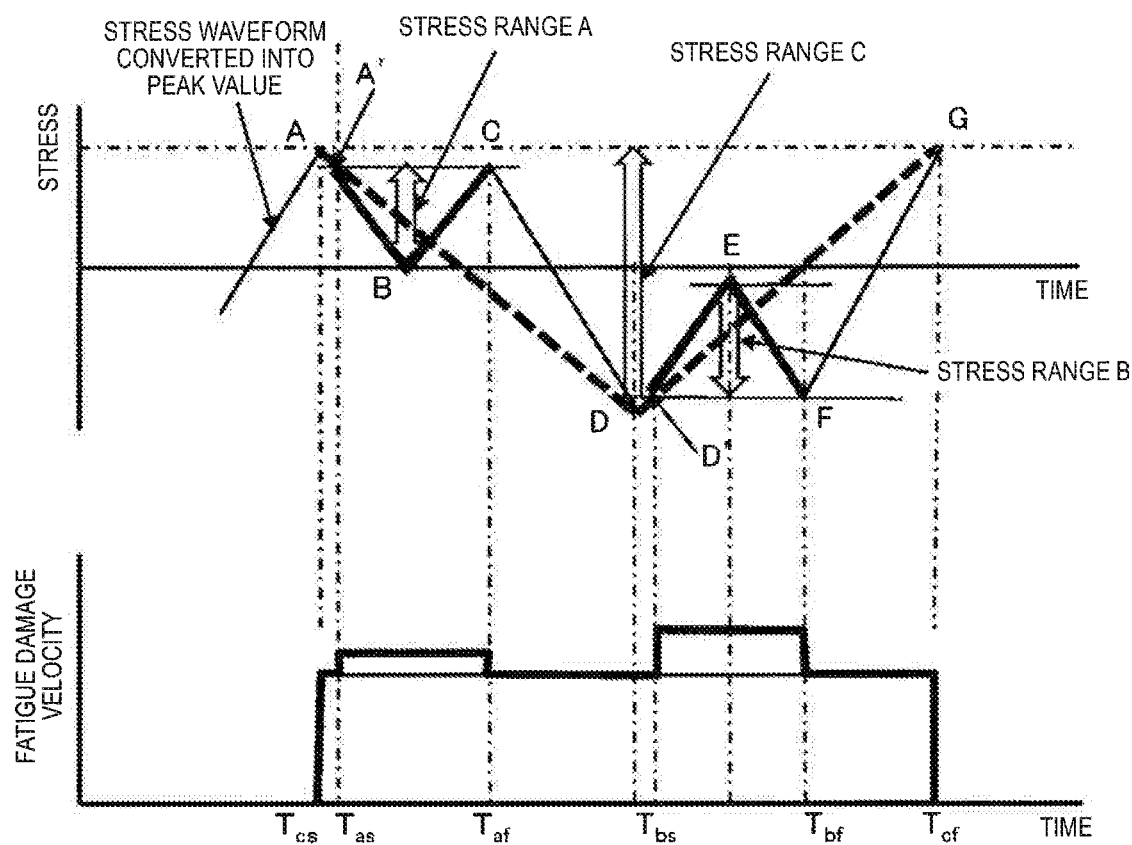

[Fig. 12]
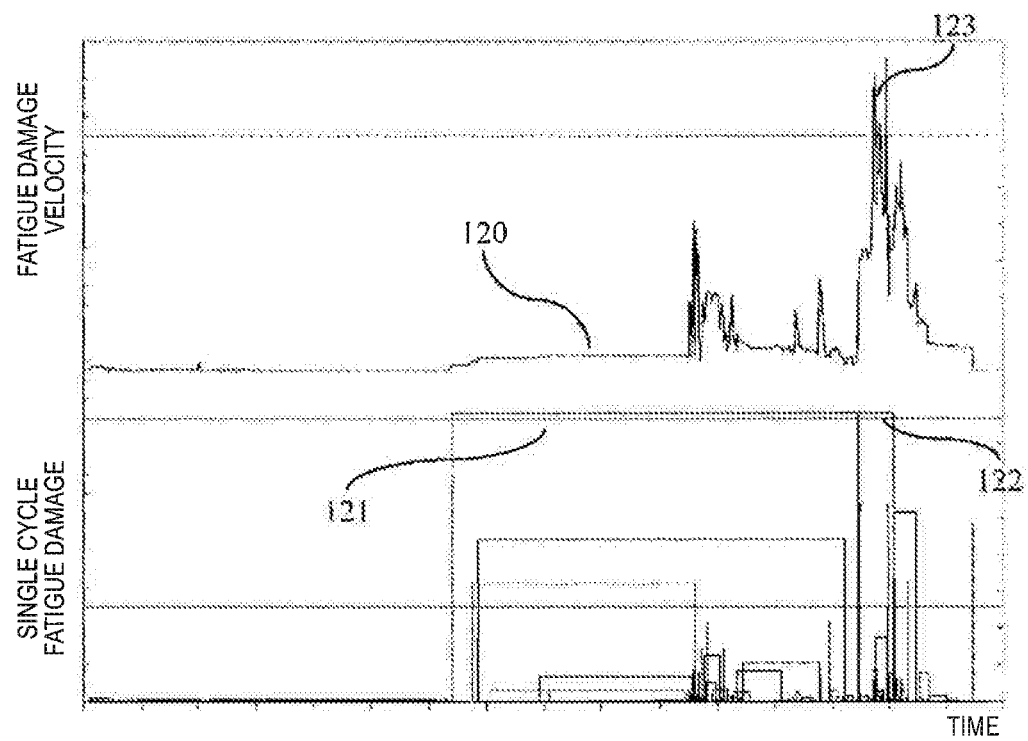

[Fig. 13]
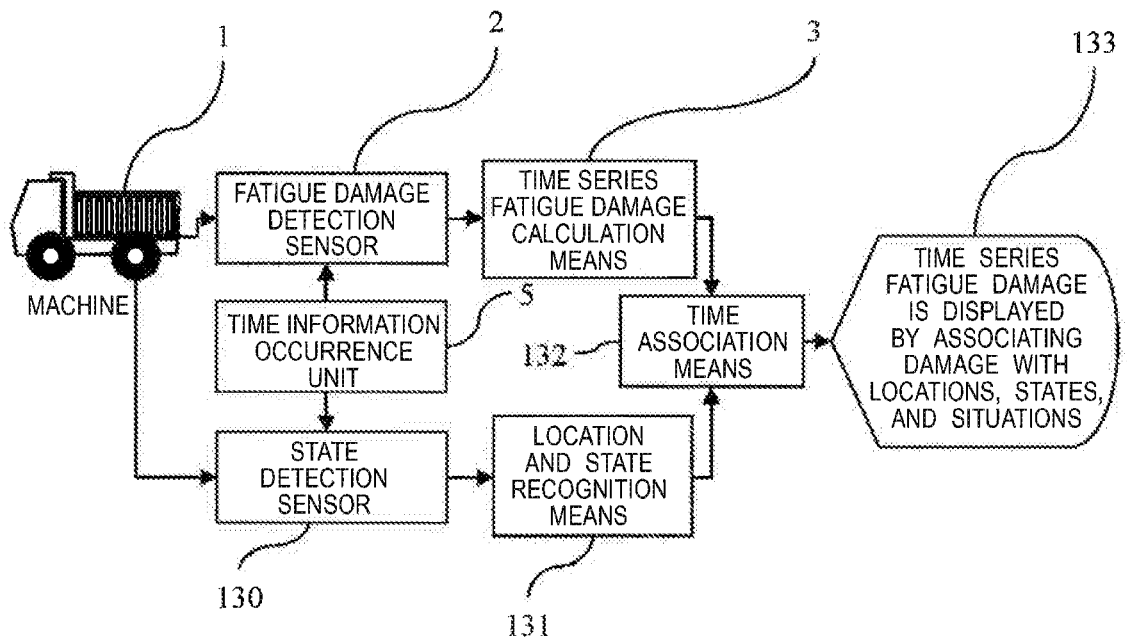
[Fig. 14]
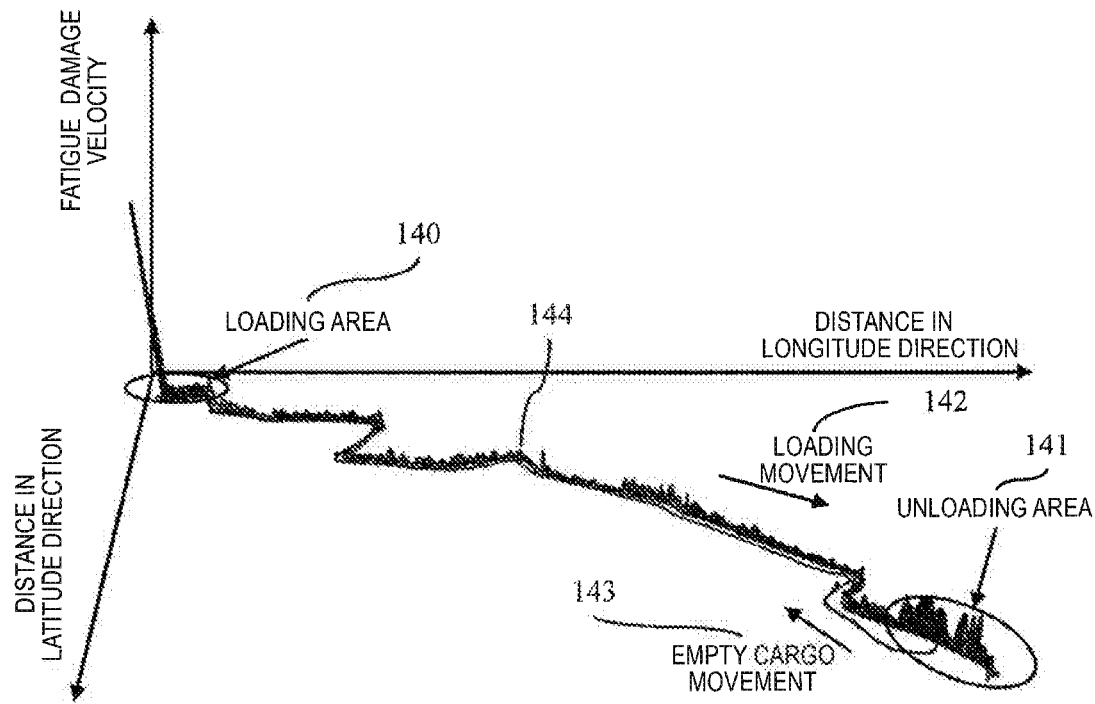

[Fig. 15]
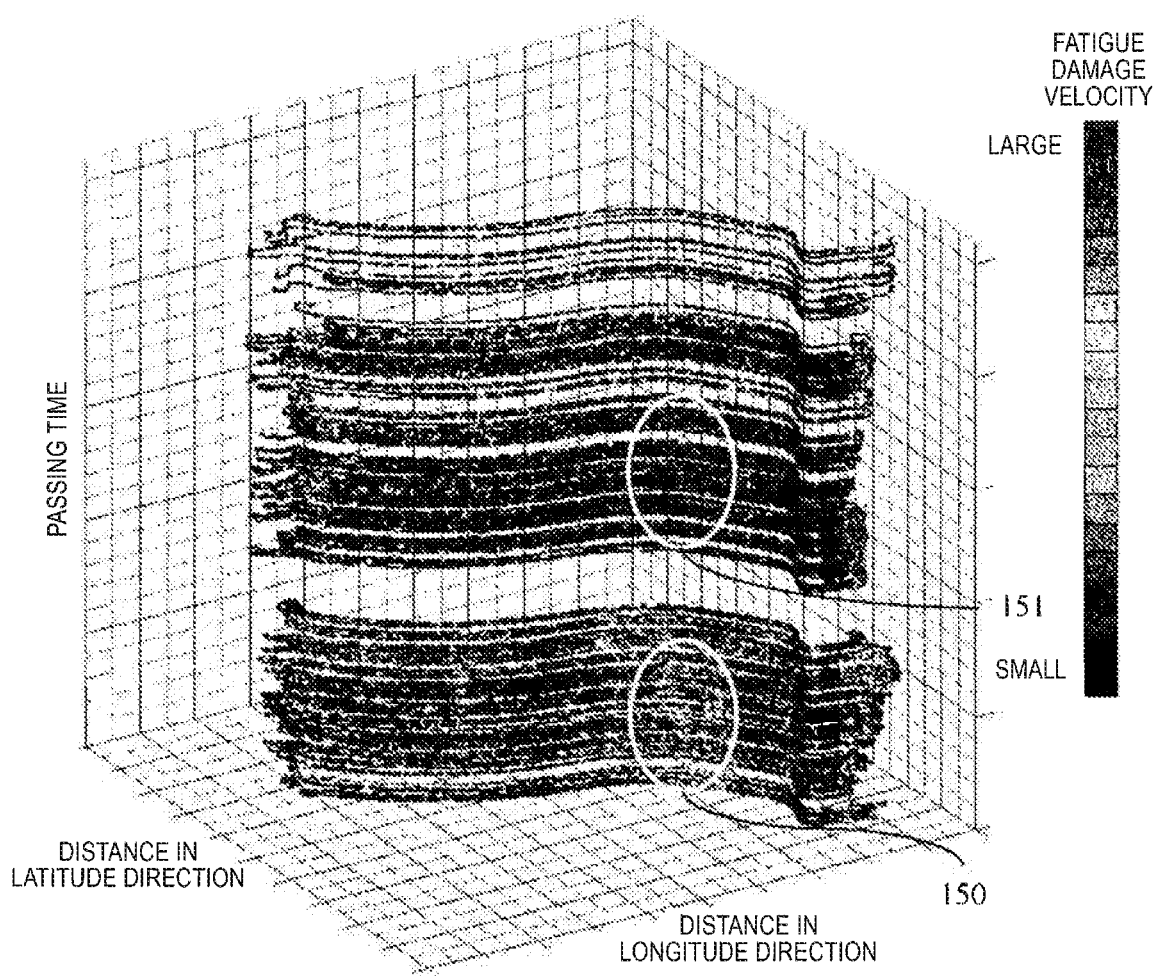

[Fig. 16]
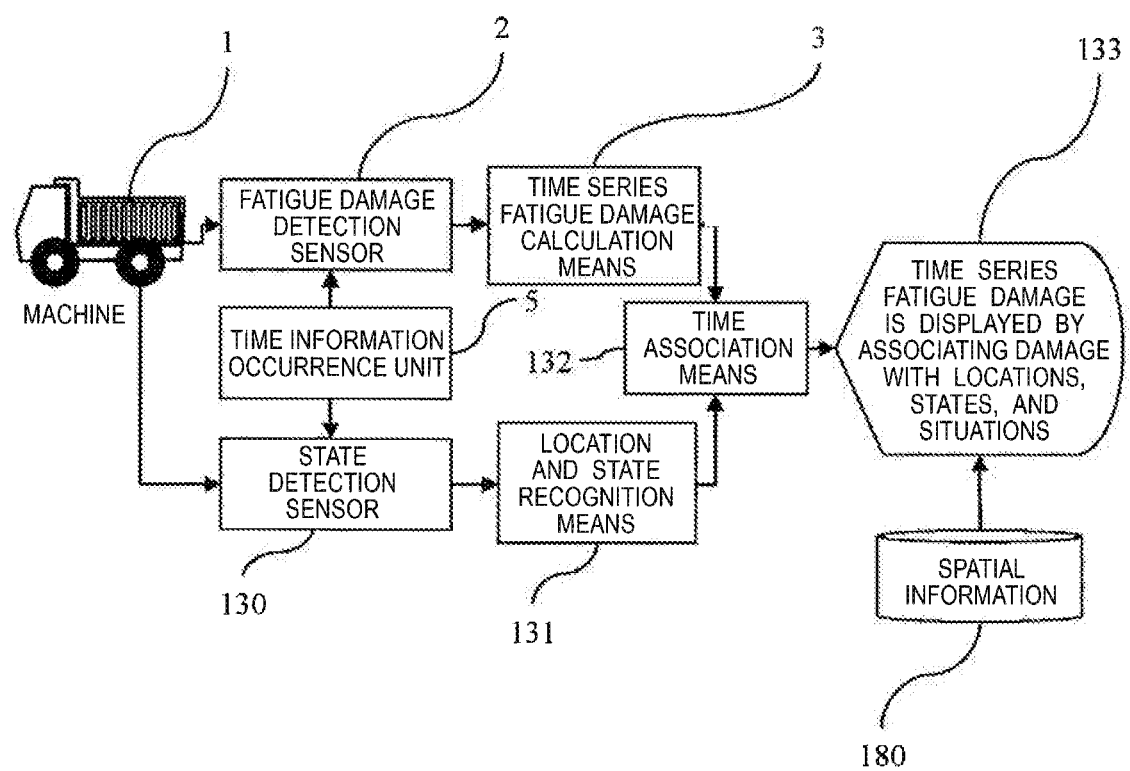

[Fig. 17]
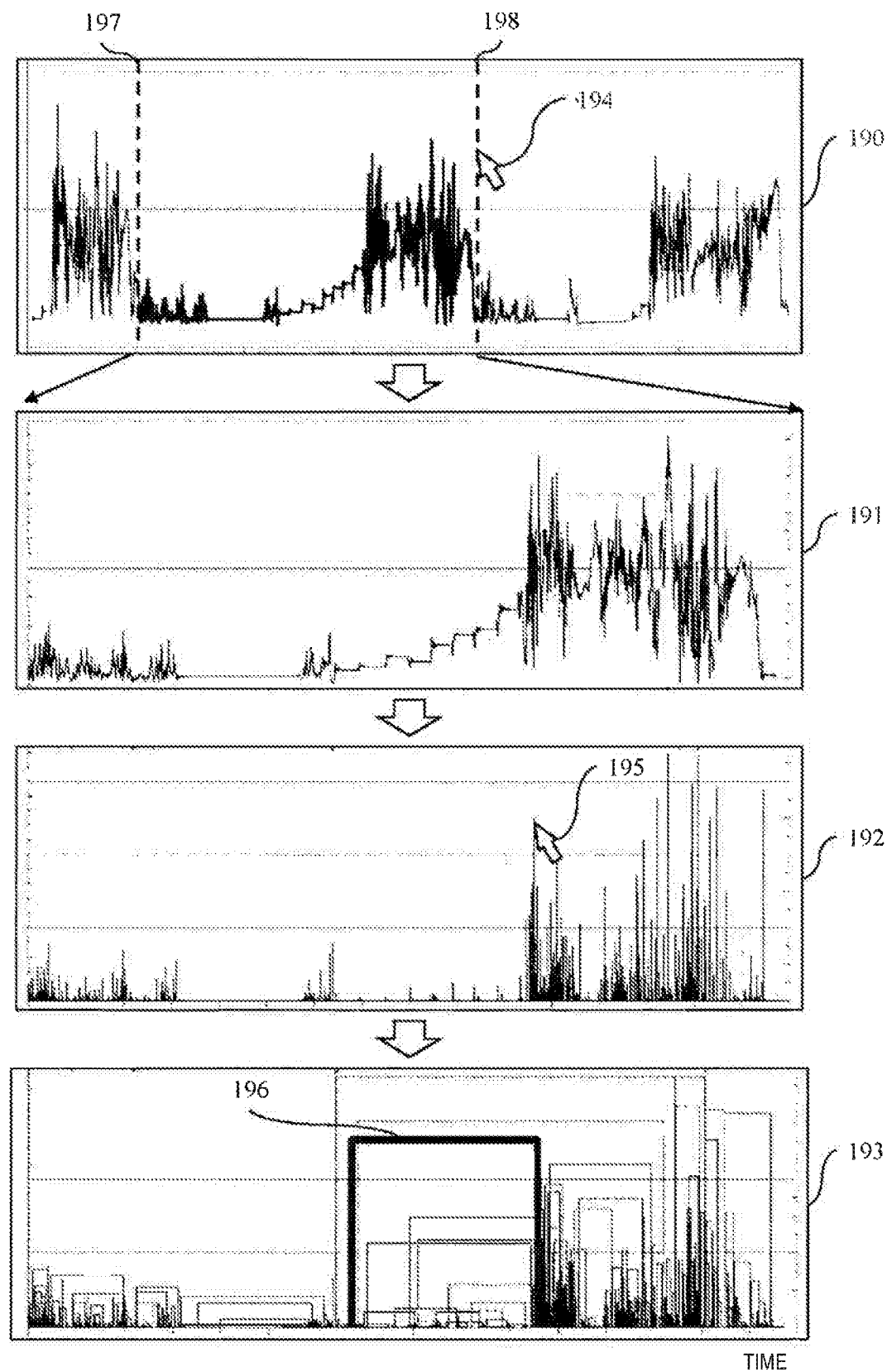

[Fig. 18]
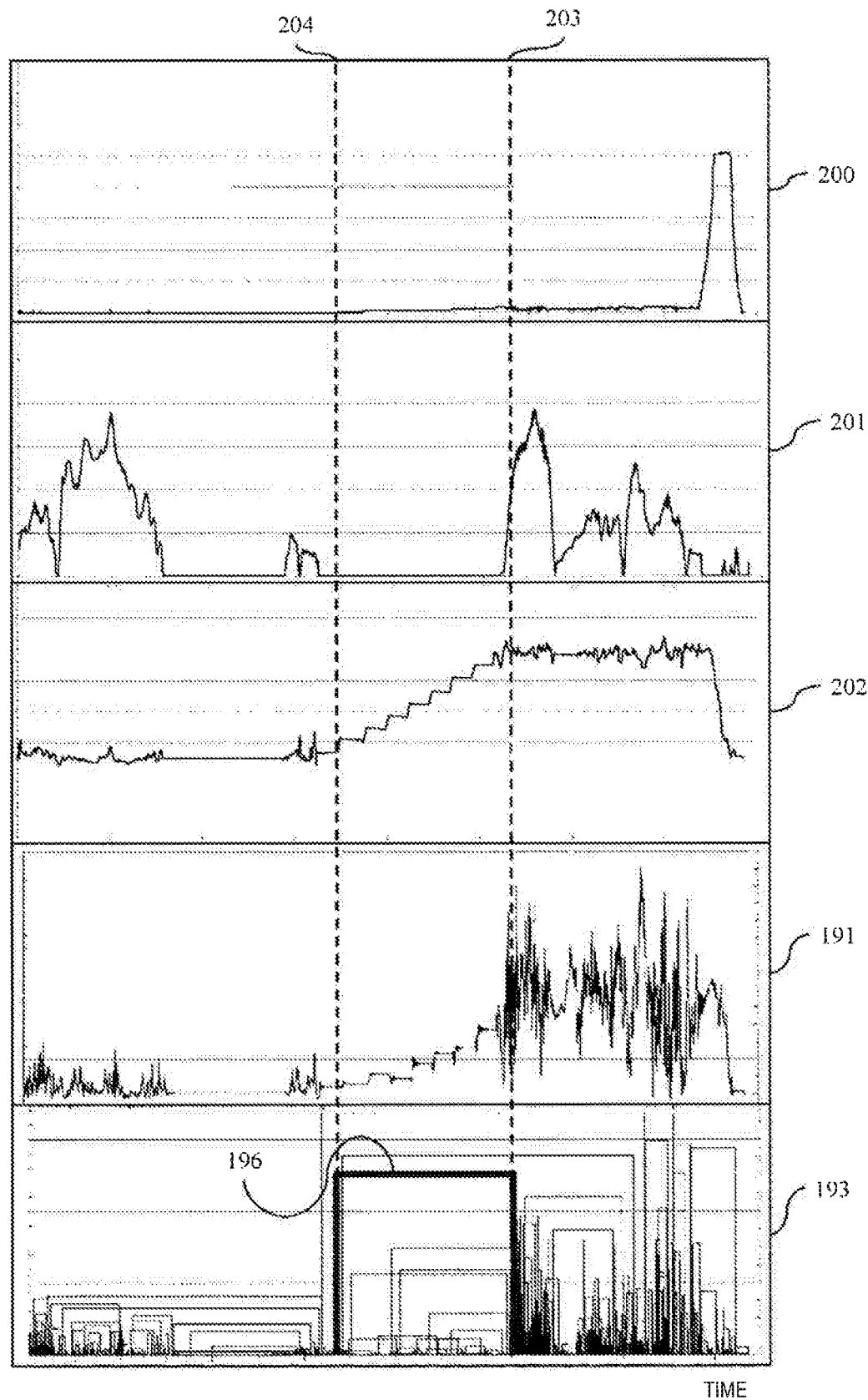

[Fig. 19]
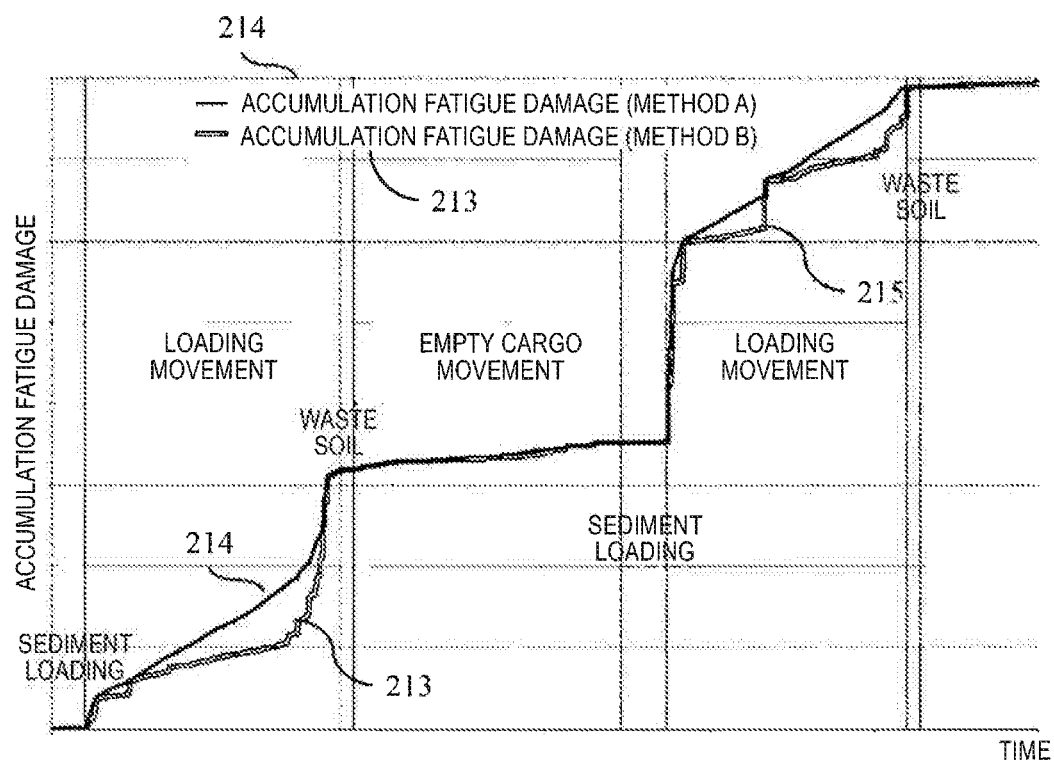

METHOD AND DEVICE DISPLAYING MATERIAL FATIGUE OF MACHINE

TECHNICAL FIELD

The present invention relates to a method and a device for displaying the occurrence situation of the fatigue of a machine such as, vehicles, construction and agricultural machines, wind mills, and the like.

BACKGROUND ART

Fatigue breakdown due to repeated stress depends on the number of times of the repeated stress and the stress amplitude (stress range) thereof. Accordingly, a method of examining an amplitude value of the repeated stress applied to material and the number of times (S-N curve) until breakdown and predicting a remaining life (fatigue damage degree and fatigue injury degree by literature) up to the fatigue breakdown using a minor law (cumulative fatigue damage law), is used.

In PTL 1, a frequency distribution of the stress amplitude with a level cross method from time series distortion data correlated with stress is calculated and a fatigue damage degree of vehicles is obtained by using the minor law.

In addition, as described in NPL 1, there is the rain flow method, as another method of obtaining the stress amplitude from time series stress data, and a method for extracting the stress amplitude from the time series stress data by using the method is described.

CITATION LIST

Patent Literature

PTL 1: JP-A-2013-79920

Non-Patent Literature

NPL 1: "Refined rainflow algorithm "P/V difference method"" Japan Society of Materials Science Journal "material", Vol. 30, No. 328, P89-P93, 1981.

SUMMARY OF INVENTION

Technical Problem

In PTL 1 and NPL 1, a cycle count method such as the level cross method and the rain flow method is used when the stress amplitude is obtained. An object of the cycle count method is to create the repeated stress that is applied to a machine as the frequency distribution of the stress amplitude.

An object of the present invention is to visualize and display machine fatigue occurring when the machine is moved or placed in various states such as a work environment, a natural environment, and the like in association with state information such as (a) where in a movement section a phenomenon is applied, (b) a type of work and operation, and (c) a type of natural phenomena being applied.

Solution to Problem

An aspect of the invention is to provide a device for displaying material fatigue of a machine including means for observing time series variation of stress by using a sensor associated with stress variation or the stress of a machine; means for detecting stress amplitude; and means for detecting an occurrence time of the stress variation. The device outputs a value and the occurrence time of the stress variation.

In addition, another aspect of the invention is to provide a device for displaying material fatigue of a machine including means for observing time series variation of stress by using a sensor associated with stress variation or the stress of a machine; means for detecting stress amplitude; and means for detecting a starting time and an ending time of the stress variation. The device outputs a value and the starting time and the ending time of the stress variation.

In addition, still another aspect of the invention is to provide a device for displaying material fatigue of a machine including means for observing time series variation of stress by using a sensor associated with stress variation or the stress of a machine; means for detecting stress amplitude; and means for detecting a starting time, an ending time, and a pole value occurrence time of the stress variation. The device outputs a value and the starting time, the ending time, and the pole value occurrence time of the stress variation.

Furthermore, in the device for displaying material fatigue of a machine according to the aspects of the invention, the stress variation may be repeated stress variation of a single cycle, converted into fatigue damage of the single cycle according to the variation, and may be output or displayed.

In addition, still another aspect of the invention is to provide a device for displaying material fatigue of a machine. The device obtains single cycle fatigue damage velocity by dividing fatigue damage of a single cycle by a time difference between a starting time and an ending time of stress variation, obtains time series fatigue damage velocity added on a time axis with fatigue damage velocity obtained from another single cycle fatigue damage, and outputs the time series fatigue damage velocity together with the time axis.

In addition, still another aspect: of the invention is to provide a device for displaying material fatigue of a machine. The device associates means for observing a state of a machine in a time series manner with stress variation, fatigue damage of a single cycle, or time series fatigue damage velocity based on time information, and outputs the stress variation, the fatigue damage of the single cycle, or the time series fatigue damage velocity, associated with state variation information of the machine.

Furthermore, in the device for displaying the material fatigue of the machine according to the aspects of the invention, the device may represent the amount of the fatigue damage accumulated until the current time by integrating the fatigue damage of the single cycle.

Advantageous Effects of Invention

According to the aspects of the invention, it is possible to compare state information of a machine in a case of occurrence of large fatigue damage and easily estimate the cause of the occurrence of fatigue damage, by displaying information through associating an occurrence interval of the fatigue damage and the state information of the machine.

BRIEF DESCRIPTION OF DRAWINGS

FIG. 1 is a configuration diagram of adding time information to single cycle fatigue damage.

FIG. 2 is a processing flow for detecting a starting time and an ending time of the single cycle fatigue damage.

FIG. 3 is a diagram illustrating a relationship between a stress waveform measured and a peak value.

FIG. 4 illustrates a relationship between a peak value waveform and stress amplitude.

FIG. 5 is an example of outputting stress amplitude in time series.

FIG. 6 is an example of displaying the starting time and the ending time of the stress amplitude.

FIG. 7 is a display example in which a measured value is used.

FIG. 8 is a display example in which a pole value is added.

FIG. 9 is an explanatory diagram of the single cycle fatigue damage.

FIG. 10 is the single cycle fatigue damage displayed by using the measured value.

FIG. 11 is an explanatory diagram of fatigue damage velocity.

FIG. 12 is the fatigue damage velocity represented by using the measured value.

FIG. 13 is a configuration diagram in which state information and fatigue damage are associated.

FIG. 14 is an example displayed by associating the state information and the fatigue damage.

FIG. 15 is an example displayed by associating the state information and the fatigue damage.

FIG. 16 is a configuration diagram for associating the state information, the fatigue damage, and the spatial information.

FIG. 17 is an example displayed by associating the state information and the fatigue damage.

FIG. 18 is an example displayed by associating the state information and the fatigue damage.

FIG. 19 is an example displayed by integrating the fatigue damage velocity in the time series.

DESCRIPTION OF EMBODIMENTS

Hereinafter, an embodiment will be described with reference to drawings.

First Embodiment

In the present embodiment, description relating to a method and a device for detecting a starting time and an ending time of stress amplitude that is an occurrence factor of fatigue damage in a machine, will be performed.

FIG. 1 is an example of a configuration diagram of a method and a device for visualizing fatigue damage of a machine in the embodiment. There are a target machine 1 that performs visualization, of the fatigue damage and a fatigue damage detection sensor 2. A dump truck is described as the target machine 1. However, the target machine 1 can be applied to other machines, for example, a mobile machine such as railway vehicles, agricultural machines, ships, aircrafts, and the like, or can be applied to machines fixed on land such as windmills, or floating on the ocean. The fatigue damage detection sensor 2 may be a sensor that directly measures stress applied to the machine, and can also be applied to a sensor for measuring a physical amount correlated with a stress value, such as an acceleration or strain sensor. Furthermore, if in the vehicles, the fatigue damage detection sensor 2 can also be applied to a sensor associated with stress applied to a vehicle body, such as suspension pressure sensors, load weight sensors, and the like.

A time information occurrence unit 5 has a function for adding a time stamp at the time of sampling data in the fatigue damage detection sensor 2.

Sampling data to which time information is added is transferred to a calculation unit 3 of the calculation and the occurrence time of the single cycle fatigue damage.

FIG. 2 illustrates a processing flow in the calculation unit 3 of the calculation and the occurrence time of single cycle fatigue damage. The processing flow is processed to extract the starting time and the ending time of the stress amplitude by improving the rain flow algorithm described in NPL 1.

First, sampling processing 21 for a peak value is performed with respect to data (measured time series stress data 20) to which the time information sampled in the fatigue damage detection sensor 2 is added.

FIG. 3 illustrates a relationship between a stress waveform measured and a waveform sampled by a peak value. A curve depicted by a dotted line is a measured stress waveform 30, and points A, B, C, D, F, F, and G are peak values 31. The peak values are pole values representing a maximum value or a minimum vague of the measured data. The magnitude of the fatigue damage depends on a stress range that is a difference between the maximum value and the minimum value of the stress waveform, and depends less on a time varied from the maximum value to the minimum value. Accordingly, stress values of the peak value A and the peak value B and the difference therebetween in FIG. 3 are important, and a shape of a stress waveform varied from the peak value A to the peak value B is not important. Accordingly, it is presupposed to use data after converting the data to peak value data in the algorithm of a cycle count method such as a rain flow method. Therefore, in the sampling processing 21 for the peak value, the sampling processing for the peak value is performed.

After that, extraction processing 22 of a closed stress amplitude value is performed by using the cycle count method.

FIG. 4 illustrates a method for extracting the stress amplitude value. An upper half portion of the drawing illustrates a stress waveform converted into a peak value, and a lower half portion of the drawing illustrates an extracted stress amplitude. A case of using the rain flow method as the cycle count method will, be described, in the rain flow method, in a case where a value of the peak value C is smaller than the peak value A, a difference between peak values B and C, as the closed stress amplitude, and stress difference of peak values B and C as a stress range or ½ of the stress range as the stress amplitude are extracted and the extracted results are output. The closed stress is the stress variation in which the stress value of the starting point and the stress value of the ending point of the stress variation are equal. The fatigue damage occurring by the closed stress amplitude is the single cycle fatigue damage. At the time of output, peak values B and C are deleted from a peak value list, and processing, as A-D-E-D-G, is performed in a peak value stress waveform. That is, in this case, the closed stress amplitude becomes A.

In processing block 23 of storing a time of the closed stress amplitude, a time $T_{af}$ of the peak value C that is a final value of the stress amplitude is stored. With this, the ending time of the stress amplitude is determined.

Next, the starting time of the closed stress amplitude is calculated (24). The starting time is A, but A is not a peak value. However, since A is the closed stress, the stress value of A is the same value as the peak value C. Therefore, a starting time $T_{as}$ can be obtained by obtaining an intersection of a straight line connecting peak values A and B by drawing a stress line as illustrated by a graph 40, rather than the peak value C. In a case where the calculated starting time is used, since it is difficult to associate the calculated starting time with state information described below, the closest measurement time among the measurement data (measured time series application data) 20 before sampling to the peak value may be processed as $T_{as}$.

Next, the extracted closed stress amplitudes (stress amplitude value a, starting time $T_{as}$, and ending time $T_{af}$) are associated and the associated result is stored (25).

Processing from processing block 22 to processing block 25 is performed until the closed stress amplitude is deleted (26). An example (in the embodiment, stress amplitudes a, b, and c and time associated with stress amplitudes) of the extracted stress amplitude value, a starting time, and an ending time is output (27).

A time series fatigue damage display unit 4 performs drawing processing by using the data output in the processing block 27.

By suspending collection data, the stress amplitude can reach an end location of the collection data before the stress amplitude is closed. In such a case, the stress amplitude of ½ cycle of the rain flow algorithm is extracted. In this case, tribute information illustrating that the stress amplitude is extracted as the stress amplitude of ½ cycle and a stress amplitude value, a starting time, and an ending time of the stress amplitude of ½ cycle are stored. FIG. 5 illustrates the stress variation applied to a dump truck at the time of performing a single cycle of empty cargo movement→sediment loading→loading movement→waste soil, and illustrates a value 50 of the stress amplitude at the ending time of the closed stress illustrated in FIG. 4. An upper half portion of the drawing draws a time series stress waveform that is measured, and a lower half portion thereof draws a stress amplitude value 51 at the ending time of the stress amplitude. The length of a single vertical bar of the stress amplitude value 51 represents the magnitude of the stress amplitude and a location on a horizontal axis represents the ending time of the closed stress amplitude.

The stress amplitude is large at the time of loading movement compared to the empty cargo movement. However, it is difficult to identify whether or not the large stress amplitude is specified due to the variation of the load weight that occurs at the time of the sediment loading.

FIG. 6 and FIG. 7 are diagrams representing a method for drawing the starting time and the ending time of the stress amplitude and the drawn result. FIG. 6 is represented using a rectangle 60 by the stress range A, starting and ending times, and a stress amplitude a. In FIG. 7, a result drawn by using actual measurement data is illustrated. FIG. 5 is represented by bars not having a width. However, it is possible to visualize an occurrence range of the stress amplitude by using the method of FIG. 6. At the time of sediment loading, prominently large stress is not expressed in FIG. 5. However, as illustrated in the stress amplitude 70 and the stress amplitude 71 of FIG. 7, the existence of the stress amplitude having a large amplitude and a long wavelength is visualized during a sediment loading period. Similarly, it is understood that the stress amplitude 72 having a long wavelength and a large stress amplitude is also drawn during a waste soil period. In addition, in a case where the stress amplitude of ½ cycle is illustrated, it is possible to represent the stress amplitude differently from the single cycle stress amplitude by varying colors, patterns, or the like of lines.

In this manner, it is possible to display the starting time and the ending time of the stress amplitude that is an occurrence factor of the fatigue damage by using this embodiment.

As illustrated in FIG. 8, it is possible to display the maximum amplitude location of the stress amplitude as symbols, or the like. The maximum amplitude location of the stress amplitude A in FIG. 8 is B. However, the maximum amplitude location may be displayed by displaying a black circle 80 on a maximum amplitude time $T_{ae}$. With this, it is possible to visualize a time at which the maximum stress amplitude occurs.

There is a need that a fatigue damage detection sensor 2 of FIG. 1 is attached at the same location as the machine 1 (portion 6 surrounded by dotted line in FIG. 1). However, a portion excluding the portion may be attached to a location excluding the machine. In this case, respective blocks such as the fatigue damage detection sensor 2, the calculation unit 3 of the calculation and the occurrence time of the single cycle fatigue damage, and the like may be communicated with each other to transfer data by using wireless communication or the like. The collection data is stored in a storage device, or the like, and the fatigue damage can be calculated and displayed in post processing.

Second Embodiment

In the embodiment 1 described above, a method for visualizing the stress amplitude is described. However, a situation of the fatigue damage by the one cycle closed stress amplitude in this embodiment will be described. The fatigue damage received by the one cycle closed stress amplitude will be referred to as "single cycle fatigue damage". A single cycle of fatigue damage f (damage) is fatigue damage by the amount of the single cycle in a stress range that is Δσ.

Accordingly, the following Equation (1) is satisfied.

$$f(\Delta\sigma)=1/N_{\Delta\sigma} \qquad \text{Equation (1)}$$

Here, in a case where repeated stress in the stress range Δσ is applied to material, $N_{\Delta\sigma}$ is the number of times indicating the fatigue breakdown of material at the number of times of the repeated stress $N_{\Delta\sigma}$. It is possible that $N_{\Delta\sigma}$ is obtained by using an S-N curve created using an actual fatigue test, and by an approximation function relating to Δσ (stress range=2 range stress amplitude).

In many cases, $N_{\Delta\sigma}$ is reduced by mth power of Δσ, and the fatigue breakdown occurs at the small number of times of repetition when Δσ is large (m is value varied based on material and shape).

Therefore, as examples in FIG. 9 and FIG. 10, an embodiment in which the stress amplitude visualized in FIG. 6 as m=3 is converted into the single cycle fatigue damage is illustrated. Since the single cycle fatigue damage is proportional to mth power of the amplitude, a large amplitude is more emphasized and the fatigue damage by a small amplitude becomes small enough to be ignored. In an example of FIG. 10, stress damage is very small at the time of empty cargo transportation, and a state in which a large amount of fatigue damage is applied at the time of the sediment loading and at the time of integrated transportation is visualized.

Third Embodiment

In the second embodiment described above, the single cycle fatigue damage is visualized. However, as illustrated in FIG. 10, it can be seen that a plurality of single cycle fatigue damages occur at the same time in an overlapping state. Therefore, a method of overlapping the single cycle fatigue damages occurring at the same time and visualizing the cycle fatigue damage applied to a machine per unit time will be described.

In the stress amplitude of the single cycle, the fatigue damage as shown in Equation (1) occurs. When it is assumed that the single cycle fatigue damage is uniformly progressed between the starting time and the ending time of the stress amplitude, the single cycle fatigue damage is uniformly progressed per unit time between the starting time and the ending time. Then, one cycle fatigue damage velocity Fv ($\Delta\sigma$, $T_{WL}$, t) satisfies the following Equation (2), where a time from the starting time and the ending time is $T_{WL}$ and a current time is t.

$$Fv(\Delta\sigma, T_{WL}, t) = f(\Delta\sigma)/T_{WL} \qquad (2)$$

However, t satisfies Fv ($\Delta\sigma$, $T_{WL}$ t)=0 before the starting time and after the ending time.

Accordingly, it is possible that the single cycle fatigue damages occurring at the same time are overlapped by calculating Equation (2) on a time axis corresponding to the entirety of the single cycle fatigue damages and the total value of the single cycle fatigue damage applied to the machine per unit time is visualized.

In this embodiment, it is assumed that the fatigue damage is uniformly progressed from the starting time to the ending time. However, the fatigue damage may be a velocity function, which is not constant, as a function of the size of the stress range within closed fatigue amplitude is created and the function is varied, or the like. Hereinafter, this is defined as fatigue damage velocity.

FIG. 11 is a diagram illustrating a relationship between the stress waveform and the fatigue damage velocity. FIG. 12 illustrates a state of the single cycle fatigue damage and the fatigue damage velocity that are actually obtained. FIG. 9 and FIG. 10 independently illustrate the single cycle fatigue damage. It is possible to totally represent an area having the large fatigue damage by performing summation processing of FIG. 11.

FIG. 12, as an actual example, illustrates a portion in which the single cycle fatigue damage is large at a graph 121. However, it can be seen that since a wavelength of the graph 121 is long, the fatigue damage velocity decreases (portion of graph 120), and the single cycle fatigue damage having a short wavelength such as a graph 122 provides larger fatigue damage velocity (portion of graph 123).

This embodiment relates to variation per unit time. However, the fatigue damage velocity at the time of moving unit distance may be processed (divides by movement distance moved from starting time to ending time instead of $T_{WL}$). In a case where the movement distance is zero or close to zero, processing or the like excluded from the calculation may be considered.

Fourth Embodiment

In embodiments up to this point, a method for detecting the starting time and the ending time of the stress amplitude is described. Hereinafter, a method for displaying information in association with state information of a machine which is detected at the same time based on the time information detected will be described.

FIG. 13 is a configuration diagram of performing displaying by associating the state information and the fatigue damage of the machine. A configuration in which a state detection sensor 130, location and state recognition means 131, and time association means 132 are added to the configuration diagram described in FIG. 1, is provided.

The state detection sensor 130, for example, includes a GPS sensor for detecting a location, a sensor for measuring altitude and temperature, and CAN data including sensing information of control and operation of the vehicle and respective parts, or the like, in a case where the machine is a vehicle. The state detection sensor 130 is a sensor for measuring a machine's own state such as up and down movement of a wave, an inclination angle of windmills, wave height and a wave direction of the wave, a wind direction, wind speed, and the like, and a sensor for measuring the environment around which the machine is installed, in a case of floating type windmills. In addition, the state detection sensor 130 may be a state detection sensor for detecting the state of a machine and video and still images captured from a driver's seat. In a case of sampling at the state detection sensor 130, time information from the time information occurrence unit 5 is added similar to the fatigue damage detection sensor 2. In a case of a sensor in which a time occurrence unit is embedded, watch information may be used.

In a case where the state of the machine detected in the state detection sensor 130 cannot be determined in a sensor alone, the location and state recognition means 131 is means for recognizing a location and a state of machine by a plurality sensor values and various signal processing means. For example, it is difficult to detect a section during which a dump truck is moved in a loading state using one sensor. However, it is possible to recognize the section during which the dump truck is moved in the loading state by performing weight (heavy) and velocity (moving) threshold processing using a loading weight sensor and a vehicle velocity sensor. In addition, recognition using location information includes area recognition, or the like. For example, in the example of the dump truck, longitude and latitude (such as closed line or curve, distance from the center, and the like) of a location where soil is loaded are specified. With this, it is possible to recognize that the dump truck enters the area when a GPS of the dump truck detects the longitude and the latitude of the area.

In the time association means 132, time series fatigue damage (for example, fatigue damage velocity, or the like described by using FIG. 11) obtained in time series fatigue damage calculation means 3 and the state information of machine obtained in the location and state recognition means 131 are associated based on the time information and time series fatigue damage is displayed in a display 133 by associating the time series fatigue damage with locations, states, and situations.

FIG. 14 is an example of the display. FIG. 14 is an example representing a state or the fatigue damage velocity applied to the vehicle body in a work cycle during which a dump truck starts from an unloading field and the soil is loaded in a loading field and the soil is discarded in the unloading field. A distance in a longitude direction, a distance in a latitude direction, and the fatigue damage velocity are illustrated in a three-dimensional manner. Drawing processing 144 is performed based on the data in which longitude and latitude information detected in the GPS and the fatigue damage velocity obtained by time series variation in a stress sensor of the dump truck are associated based on the time information. A variation state of the fatigue damage velocity that changes on a movement trajectory is read.

Although not represented in the drawing due to the expression ability, it is possible to represent empty cargo transportation and loading transportation by varying color recognized in the above-described method. A travel direction of empty cargo movement 143 and a travel direction of loading movement 142 are described by an arrow. However, the fatigue damage velocity is small at the time of the empty cargo movement and is large at the time of the loading movement. It is possible to visualize the difference of the fatigue damage velocity due to the state by varying the color.

In addition, although description is performed in the next embodiment, it is possible to illustrate a result recognized by a value in the state detection sensor 130 and the location and state recognition means 131 at the same time on the same path or in another screen, by clicking a mouse pointer or the like on a location in which the fatigue damage velocity is large. This can be used as determination material for the analysis factor that the fatigue damage velocity becomes large.

Furthermore, a loading area 140 and an unloading area 141 are surrounded by an ellipse. However, it is possible to recognize the above-described area and represent, by different colors, entering the loading area and the unloading area. In addition, it is also possible to recognize more detailed state items and express each of the items using different colors. It is possible to visualize which work has the largest fatigue damage velocity. FIG. 15 illustrates a different expressing method. A base illustrates a movement distance in a longitude and latitude direction and a height direction illustrates an elapsed time Therefore, FIG. 15 is an example illustrating the fatigue damage velocity by using color. FIG. 15 is a diagram visualizing that a dump truck is moved on the same path and how to change the fatigue damage velocity applied on the path with the passage of time. A thinning portion of color in a portion 150 disappears in a portion 151 on the same path. The drawing illustrates that leveling work of roads is performed after a time in the portion 150 and the roughness of a road surface is reduced such that the fatigue damage velocity decreases. It is possible to visualize the effect of the leveling work of roads by performing the visualization.

In FIGS. 14 and 15, a planar surface representing the longitude and the latitude is represented as plain. However, it is also possible to display information by overlapping map information and terrain information of the image or a vector based on longitude and latitude information.

FIG. 16 illustrates a configuration diagram of the embodiment. In means for displaying the time series fatigue damage in association with locations, states, and situations in a display 133 for displaying time series fatigue damage in association with the locations, the states, and the situations, display processing is performed with reference to a spatial information DB 180. Spatial information is information storing a variety of information on a three-dimensional space as information capable of drawing. For example, the spatial information includes map information represented as a vector or image, terrain information such as altitude, and information representing the attribute of the locations and roads such as coniferous forests, a broad-leaved forest zone, a city, and furthermore, paved roads and unpaved roads, or the like. In this manner, it is possible to use as a determination material for the analysis factor by displaying the spatial information in a superposition manner so as to easily verify in what kind of environments large fatigue damage velocity is applied.

As described above, a method for visualizing the magnitude of the fatigue damage velocity by mapping the fatigue damage velocity on a movement path is described. The stress amplitude 51 illustrated in FIG. 5 instead of the fatigue damage velocity, the stress amplitude (70, 71, 72, or the like) representing the starting time and the ending time illustrated in FIG. 7, a location (80, 82, or the like) of a pole value of the stress amplitude described in FIG. 8, and the stress amplitude illustrated in FIG. 10 may be represented as a value converted into the fatigue damage.

Fifth Embodiment

As described in the previous embodiment in FIG. 17 and FIG. 18, a display procedure representing a value by showing together the value of a state detection sensor associated with specific stress amplitude, will be described.

FIG. 17 is an example illustrating a display procedure and FIG. 18 is an example illustrating finally the procedure.

First, as illustrated in FIG. 17, a stress waveform 190 is displayed. Cut-out processing of interval indicating an interval during which processing is performed is performed by using a mouse pointer 194. In the example of a stress waveform 190, a starting point of the cut-out processing is 197 and an ending point is 198. As illustrated in 191, a cut-out waveform is displayed.

In this embodiment, the cut-out processing is manually performed. However, it is possible to automatically perform the cut-out processing by using the location and state recognition means 131 so as to process, by using a variation point in which a recognition result is varied, as a cut-out point. For example, in a case where the dump truck repeats a work of "empty cargo movement→sediment loading→loading movement→waste soil", the work is defined as one working cycle, and the cut-out processing is performed as a completion time of the "waste soil" is a variation point. Here, for example, recognition processing of the completion of the waste soil may use a signal indicates that a dump body (bucket unit that carries the soil) is moved from a standing up state to a seated state on the dump vehicle body according to waste soil operation. Similarly, it is possible to perform analysis using a stress waveform in which only a "waste soil" state is cut out, when the empty cargo movement, the sediment loading, and loading movement are recognized.

A graph 192 is a result obtained from extracting the stress amplitude by using the rain flow method using the stress waveform 191. A user selects the stress amplitude by using a mouse pointer 195. As illustrated in graph 193 by the selection, a starting time and an ending time of the stress amplitude corresponding to the selected stress amplitude 195 are represented by highlighting the stress amplitude as illustrated in a graph 196.

Then, as illustrated in FIG. 18, when stress amplitude is determined, information of a state detection sensor associated with the stress amplitude is displayed.

A starting time 204 and an ending time 203 of a graph 196, and a graph 200 illustrate an angle (state in which dump body of vehicle having smallest value is seated) of the dump body, vehicle velocity 201, and a vehicle weight sensor 202.

At this time, it can be seen that the vehicle weight increases during a period that the stress amplitude 196 occurs. That is, by loading of the soil, the stress amplitude given a state in which the stress amplitude is greatly varied. (large weight variation from empty load to full load) becomes a factor to be determined in this diagram.

In addition, information may be displayed by associating video images and still images and time information other than sensor and control information. For example, video images may be displayed during a time interval of the graph 196 when the graph 196 is clicked with a mouse by using video images captured with time information, and video images corresponding to the time information that is specified by the mouse may be displayed.

In this embodiment, the starting time and the ending time of the stress amplitude are represented in a graph 193. A location (80, 82, or the like) of a pole value of the stress amplitude described in FIG. 8 added with the starting time and the ending time may be represented, and the stress amplitude illustrated in FIG. 10 may be represented as a value converted into the fatigue damage.

Sixth Embodiment

In the description of the embodiments, a method for obtaining the fatigue damage velocity at each time and together displaying corresponding state information is described.

This embodiment illustrated in FIG. 19 is an example in which the fatigue damage velocity is displayed as integration fatigue damage by integrating the fatigue damage velocity in time series. A method B of a (graph 213 is an example converting the magnitude of the stress amplitude extracted from the rain flow method illustrated in FIG. 5 into single cycle fatigue damage, and displaying the converted result on a time axis through integration. A method A of a graph 214 is an example displaying the fatigue damage velocity illustrated in FIG. 12 on a time axis through integration. That is, method A includes integration values of the fatigue damage obtained by considering a starting point and a stop point of the stress amplitude, method B includes values in which a final location of the stress amplitude extracted from the rain flow method is integrated as a representative location. The integration values represent an accumulation state of the fatigue damage applied to the machine until this point and represent large accumulation amount as a slope thereof is large. In the method B, a waveform is varied in a stepwise manner as illustrated in a graph 215 for seeking integration fatigue damage from a discrete stress amplitude value extracted from the rain flow method. However, in the method A, a smooth waveform is processed such that the stress amplitude value is converted into fatigue damage velocity having a width by the Equation (2) and the converted fatigue damage velocity is integrated with another stress amplitude value existing on the same time.

It is possible to represent a diagram in which the total amount of the fatigue damage received until this point from the magnitude of the integration fatigue damage and the magnitude of the accumulation velocity of the fatigue damage at a corresponding time from a slope thereof can be read.

The method A with a high accuracy may be illustrated by drawing the diagram in consideration with an occurrence range of the stress amplitude.

The invention claimed is:

1. A device for displaying material fatigue of a target machine comprising:
a fatigue damage detection sensor receiving an input signal associated with stress from the target machine and providing, as a measured stress waveform, an output signal representing pole values indicating maximum and minimum measured values of said stress and including a time stamp;
a time information occurrence unit adding said time stamp at a time of sampling data in the fatigue damage detection sensor;
a calculation unit receiving the output signal representing the pole values indicating the maximum and minimum measured values of said stress and including the time stamp from the fatigue damage detection sensor, calculating the measured stress waveform by detecting a variation in stress amplitude and an occurrence time of the variation in stress amplitude, converting the measured stress waveform into peak stress values, extracting a stress amplitude from the peak stress values, identifying as a closed stress a stress variation having equal starting and ending points, obtaining a product of the variation in stress amplitude and the occurrence time of the variation in stress amplitude, and outputting display information including the product obtained; and
a display unit to receive the display information from the calculation unit and display, as the material fatigue of the target machine, a time series variation of stress obtained from the product of the variation in stress amplitude and the occurrence time of the variation in stress amplitude.

2. The device for displaying material fatigue of a machine according to claim 1, wherein the variation in stress amplitude is repeated variation of a single cycle, and the calculation unit converts the variation in stress amplitude into fatigue damage of the single cycle and outputs the fatigue damage of the single cycle.

3. The device for displaying material fatigue of a machine according to claim 1, wherein output from the calculation unit is supplied to a device that associates a state of a machine in a time series manner with variation in stress amplitude, fatigue damage of a single cycle, or time series fatigue damage velocity based on time information, and outputs the variation in stress amplitude, the fatigue damage of the single cycle, or the time series fatigue damage velocity, associated with state variation information of the machine, to the display unit.

4. The device for displaying material fatigue of a machine according to claim 1, wherein the fatigue damage detection sensor directly measures stress applied to the target machine.

5. The device for displaying material fatigue of a machine according to claim 1, wherein the fatigue damage sensor measures a physical amount correlated with a stress value.

6. The device for displaying material fatigue of a machine according to claim 5, wherein the fatigue damage sensor is applied to an acceleration sensor.

7. The device for displaying material fatigue of a machine according to claim 5, wherein the fatigue damage sensor is applied to a strain sensor.

8. The device for displaying material fatigue of a machine according to claim 1, wherein the display unit performs drawing processing by using stress amplitude value, starting time, and ending time data output from the calculation unit.

9. A device for displaying material fatigue of a target machine comprising:
a fatigue damage detection sensor receiving an input signal associated with stress from the target machine and providing, as a measured stress waveform, an output signal representing pole values indicating maximum and minimum measured values of said stress and including a time stamp;
a time information occurrence unit adding said time stamp at a time of sampling data in the fatigue damage detection sensor;
a calculation unit receiving the output signal representing the pole values indicating maximum and minimum measured values of said stress and including the time stamp from the fatigue damage detection sensor, calculating the measured stress waveform by detecting a variation in stress amplitude, a starting time of the variation in stress amplitude, and an ending time of the variation in stress amplitude, converting the measured stress waveform into peak stress values, extracting a stress amplitude from the peak stress values, identifying as a closed stress a stress variation having equal starting and ending points, obtaining a product of the variation in stress amplitude and a difference between the starting time of the variation in stress amplitude and the ending time of the variation in stress amplitude, and outputting display information including the product obtained; and a display unit to receive the display information from the calculation unit and display, as the material fatigue of the target machine, a time series variation of stress obtained from the product of the variation in stress amplitude and the difference between the starting time of the variation in stress amplitude and the ending time of the variation in stress amplitude.

10. The device for displaying material fatigue of a machine according to claim 9, wherein the calculation unit obtains single cycle fatigue damage by dividing fatigue damage of a single cycle by a time difference between the starting time and the ending time of variation in stress amplitude, obtains time series fatigue damage velocity added on a time axis with fatigue damage velocity obtained from another single cycle fatigue damage, and outputs to the display unit the time series fatigue damage velocity together with the time axis.

11. The device for displaying the material fatigue of a machine according to claim 10, wherein the calculation unit represents the amount of the fatigue damage accumulated until the current time by integrating the fatigue damage of the single cycle.

12. The device for displaying material fatigue of a machine according to claim 9, wherein the fatigue damage detection sensor directly measures stress applied to the target machine.

13. The device for displaying material fatigue of a machine according to claim 9, wherein the fatigue damage sensor measures a physical amount correlated with a stress value.

14. The device for displaying material fatigue of a machine according to claim 13, wherein the fatigue damage sensor is applied to an acceleration sensor.

15. The device for displaying material fatigue of a machine according to claim 13, wherein the fatigue damage sensor is applied to a strain sensor.

16. The device for displaying material fatigue of a machine according to claim 9, wherein the display unit performs drawing processing by using stress amplitude value, starting time, and ending time data output from the calculation unit.

17. A device for displaying material fatigue of a target machine comprising:
a fatigue damage detection sensor receiving an input signal associated with stress from the target machine and providing, as a measured stress waveform, an output signal representing pole values indicating maximum and minimum measured values of said stress and including a time stamp;
a time information occurrence unit adding said time stamp at a time of sampling data in the fatigue damage detection sensor;
a calculation unit receiving the output signal representing the pole values indicating the maximum and minimum measured values of said stress and including the time stamp from the fatigue damage detection sensor, calculating the measured stress waveform by detecting a variation in stress amplitude, a starting time of the variation in stress amplitude, an ending time of the variation in stress amplitude, and a pole value occurrence time of the variation in stress amplitude, converting the measured stress waveform into peak stress values, extracting a stress amplitude from the peak stress values, identifying as a closed stress a stress variation having equal starting and ending points, obtaining a product of the variation in stress amplitude and a difference between the starting time of the variation in stress amplitude and the ending time of the variation in stress amplitude, obtaining the pole value occurrence time of the variation in stress amplitude, and outputting display information including the product obtained; and
a display unit to receive the display information from the calculation unit and display, as the material fatigue of the target machine, a time series variation of stress obtained from the product of the variation in stress amplitude, and the starting time of the variation in stress amplitude and the ending time of the variation in stress amplitude, as well as the pole value occurrence time of the variation of the variation in stress amplitude.

18. The device for displaying material fatigue of a machine according to claim 17, wherein the fatigue damage detection sensor directly measures stress applied to the target machine.

19. The device for displaying material fatigue of a machine according to claim 17, wherein the fatigue damage sensor measures a physical amount correlated with a stress value.

20. The device for displaying material fatigue of a machine according to claim 19, wherein the fatigue damage sensor is applied to an acceleration sensor.

* * * * *